US012663546B2

(12) United States Patent
Hu et al.

(10) Patent No.: US 12,663,546 B2
(45) Date of Patent: Jun. 23, 2026

(54) LASER SENSING-BASED METHOD FOR SPATIAL POSITIONING OF AGRICULTURAL ROBOT

(71) Applicant: SOUTH CHINA AGRICULTURAL UNIVERSITY, Guangzhou (CN)

(72) Inventors: Lian Hu, Guangzhou (CN); Zhimin Wang, Guangzhou (CN); Jie He, Guangzhou (CN); Xiwen Luo, Guangzhou (CN); Pei Wang, Guangzhou (CN)

(73) Assignee: SOUTH CHINA AGRICULTURAL UNIVERSITY, Guangzhou (CN)

( * ) Notice: Subject to any disclaimer, the term of this patent is extended or adjusted under 35 U.S.C. 154(b) by 961 days.

(21) Appl. No.: 17/862,853

(22) Filed: Jul. 12, 2022

(65) Prior Publication Data

US 2023/0117386 A1     Apr. 20, 2023

(30) Foreign Application Priority Data

Jul. 13, 2021     (CN) .......................... 202110792264.5

(51) Int. Cl.
G01S 17/894          (2020.01)
G01S 17/00          (2020.01)
(Continued)

(52) U.S. Cl.
CPC .......... G01S 17/894 (2020.01); G01S 17/003 (2013.01); G01S 17/42 (2013.01); G01S 17/931 (2020.01); G05D 1/0236 (2013.01)

(58) Field of Classification Search
CPC .... G01S 17/894; G01S 17/931; G01S 17/003; G01S 17/42; G05D 1/0236; G05D 1/0234; G05D 1/0231; Y02A 40/10
See application file for complete search history.

(56) References Cited

U.S. PATENT DOCUMENTS

2013/0054187 A1* 2/2013 Pochiraju .............. G01S 7/4817
                                                                     702/150
2019/0257923 A1* 8/2019 Xie ........................ G05D 1/106

OTHER PUBLICATIONS

S. Kaewkorn, M. Ekpanyapong and U. Thamma, "High-Accuracy Position-Aware Robot for Agricultural Automation Using Low-Cost IMU-Coupled Triple-Laser-Guided (TLG) System," in IEEE Access, vol. 9, pp. 54325-54337 (Year: 2021).*

(Continued)

*Primary Examiner* — Yuqing Xiao
*Assistant Examiner* — Isabelle Lin Boegholm
(74) *Attorney, Agent, or Firm* — The Webb Law Firm

(57)          ABSTRACT

A laser perception-based method for spatial positioning of an agricultural robot: erecting a laser radar with a ranging function in a positioning space, setting a three-dimensional coordinate system, and conducting scanning using the laser radar to obtain point cloud data of an object in the positioning space, where the point cloud data include an azimuth and a distance with respect to the laser radar; installing a laser receiver on the agricultural robot, receiving a laser radar signal using the laser receiver during movement, when a laser beam emitted by the laser radar irradiates the laser receiver, outputting laser signal data and elevation data from the laser receiver; conducting time-event matching on the laser signal data obtained by the laser receiver and the point cloud data scanned by the laser radar within each scanning period of the laser radar to obtain three-dimensional coordinates of a central position of the laser receiver.

8 Claims, 2 Drawing Sheets

(51) Int. Cl.
    G01S 17/42        (2006.01)
    G01S 17/931     (2020.01)
    G05D 1/00        (2024.01)

(56)          References Cited

OTHER PUBLICATIONS

D. Shi, H. Mi, E. G. Collins and J. Wu, "An Indoor Low-Cost and High-Accuracy Localization Approach for AGVs," in IEEE Access, vol. 8, pp. 50085-50090 (Year: 2020).*

Zang Y, Meng S, Hu L, Luo X, Zhao R, Du P, Jiao J, Huang H, Chen G. Optimization Design and Experimental Testing of a Laser Receiver for Use in a Laser Levelling Control System. Electronics (Year: 2020).*

* cited by examiner

LASER SENSING-BASED METHOD FOR SPATIAL POSITIONING OF AGRICULTURAL ROBOT

CROSS REFERENCE TO RELATED APPLICATION

This patent application claims priority to Chinese Patent Application No. 202110792264.5 filed Jul. 13, 2021, the disclosure of which is hereby incorporated by reference in its entirety.

BACKGROUND

Technical Field

The present disclosure relates to the field of robot navigation and positioning, and in particular, to a laser sensing-based method for spatial positioning of an agricultural robot.

Description of Related Art

With the advent of the intelligent era and emergence of high and new technologies, great changes have taken place in various industries. Unmanned farm technology will be a strong support for modern agriculture, by which agricultural robots will replace most manual operations. Robot positioning and navigation is the core technology for agricultural robots to realize autonomous movement. However, such scenarios as blocking or missing of a great amount of GNSS information often occur in agricultural operating environment, such as greenhouses, hangars, bridges and other facilities. How to achieve precise positioning under the condition of zero (weak) GNSS signal and realize continuous precise and stable positioning of robots in and out of facilities is an essential point to be broken through in autonomous movement of agricultural robots for unmanned farms.

According to the main sensors used, commonly used positioning and navigation technologies can be classified into GNSS positioning technology, laser positioning technology, SLAM technology and so on.

(1) Global Navigation Satellite System (GNSS) is an air-based radio navigation and positioning system which can offer users with all-weather services regardless of weather factors on the earth surface or any location in near-earth space, such as providing 3D coordinates, velocity and timing. GNSS includes one or more satellite constellations and satellite based augmentation system needed to support specific tasks. GNSS positioning technology has the advantages of high positioning accuracy, short observation time, free from intervisibility between stations, ease of instrument operation, high adaptability and so on. However, it may be affected by many factors, including buildings, viaducts, radio waves, making it impossible to achieve complete positioning and precise indoor positioning.

(2) Laser positioning refers to a technology of obtaining surrounding environment information through laser radars, and positioning a certain target with the aid of some auxiliary units, which is suitable for indoor applications. Laser triangulation location is one of the mainstream methods in laser positioning technology, which is implemented by the following process: arrange and install a certain number of reflectors in an environment, calculate the distance between the laser and all the reflectors in the process of laser scanning for one circle; at the same time, according to the sensing time and scanning period, calculate the distance between any two reflectors by using a trigonometric formula; and compare the measured distances with the offline theoretical value to match the number and position information for each reflector. Laser positioning technology has the advantages of stability, reliability, high-performance continuity, long service life and low cost of later transformation. However, laser light is very likely to get blocked, and in the case of many obstacles, identifying obstacles through point cloud requires heavy workload, and the analysis work is all the more difficult.

(3) SLAM technology is a technology by which a robot observes the map features in real time while moving in an unknown environment, and then matches the map features according to the changes of its own position, so as to complete positioning and mapping. The mainstream SLAM technology is mainly classified into laser SLAM and visual SLAM. As early as 2005, laser SLAM had been studied thoroughly and the framework had been preliminarily determined. Laser SLAM is the most stable and mainstream positioning and navigation method.

So far, there is still no effective solution to the problems existing in the laser positioning technology.

SUMMARY OF THE INVENTION

In view of the technical problems existing in the prior art, the objective of the present disclosure is to provide a laser sensing-based method for spatial positioning of an agricultural robot, which is characterized by lighter computation burden, and less running time of algorithms.

To realize the above objective, the present disclosure adopts the following technical solutions:

A laser sensing-based method for spatial positioning of an agricultural robot, including:

Step 1: erecting a laser radar with a ranging function in a positioning space, setting a three-dimensional coordinate system, and conducting scanning using the laser radar to obtain point cloud data of an object in the positioning space, where the point cloud data include an azimuth and a distance with respect to the laser radar.

Step 2: installing a laser receiver on the agricultural robot, receiving a laser radar signal using the laser receiver during movement, and when a laser beam emitted by the laser radar irradiates the laser receiver, outputting laser signal data and elevation data from the laser receiver.

Step 3: conducting time-event matching on the laser signal data obtained by the laser receiver and the point cloud data scanned by the laser radar within each scanning period of the laser radar to obtain three-dimensional coordinates of a central position of the laser receiver.

As a preferred solution, in Step 1, each piece of point data of the point cloud data includes a distance from an obstacle to the laser radar, an angle with respect to an initial scanning line of the laser radar, and a time label.

As a preferred solution, in Step 1, the laser radar is erected to ensure that the laser scanning plane is horizontal, the installation height is known, and the laser receiver is installed within the range of the received laser scanning plane, and an initial height of the laser receiver is obtained according to the elevation data fed back by the laser receiver after laser light irradiates the laser receiver.

As a preferred solution, the laser receiver includes a filter housing configured to eliminate ambient light and two photosensitive arrays configured to sense a laser signal, and output the laser signal as sensing laser status data after signal processing; the photosensitive arrays are divided into several segments in the vertical direction, different segments of the photosensitive arrays sense a laser signal and express the laser signal as elevation data of the laser receiver, each frame of laser signal data includes a piece of sensing laser status data and corresponding elevation data of the laser receiver, the laser receiver is kept within a range of the laser scanning plane at which laser irradiation can be received by an electric push rod, the laser signal data and the point cloud data output by the laser radar both have a time label, and a set of point cloud data output by the laser radar and a set of laser signal data output by the laser receiver are obtained by conducting scanning using the laser radar for a same circle.

As a preferred solution, time-event matching in Step 3 specifically includes realizing positioning of the agricultural robot by representing a point in the point cloud data corresponding to a same time at which the laser signal is obtained and received by the laser receiver as a position of the laser receiver fixed on the mobile agricultural robot in the three-dimensional coordinate system with the laser radar as a coordinate origin.

As a preferred solution, in Step 1, the three-dimensional coordinate system is constructed as follows:

Setting a central position $O(X, Y, H)$ of the laser radar as the origin of the three-dimensional coordinate system, setting $L_1$ as a first laser ray emitted by the laser radar, setting $L_n$ as a last laser ray emitted by the laser radar, setting $L_{R1}$ as a first ray emitted by the laser radar and irradiating the laser receiver, setting as a last ray emitted by the laser radar and irradiating the laser receiver, and denoting points of intersection of the rays $L_{R1}$ and $L_{Rn}$ with the laser radar as $R_1(x_1, y_1, h)$ and $R_n(x_n, y_n, h)$, respectively.

Solving three-dimensional point cloud coordinates from an included angle $\rho$ between a corresponding laser ray and the first laser ray emitted by the laser radar, and a measured relative distance d by formulas $x=d\cdot\cos\rho$ and $y=d\cdot\sin\rho$.

When the laser radar conducts scanning for one circle, obtaining coordinates of points $R_1(x_1, y_1, h)$, $R_n(x_n, y_n, h)$ by time-event matching between the time label of receipt of the laser signal in the laser sign data and r radar point cloud data, so as to obtain three-dimensional coordinates $$\left(\frac{x_1 + x_n}{2}, \frac{y_1 + y_n}{2}, h\right)$$

of the central position of the laser receiver within this scanning period.

As a preferred solution, elevation data h are obtained specifically by comparing an initial height $h_1$ of the laser receiver corresponding to an initial height of the laser receiver with elevation data h' of the laser receiver obtained in a measurement process, where when the height of the laser receiver height is smaller than the initial height of the laser receiver, h' is negative, when the height of the laser receiver is greater than the initial height of the laser receiver, h' is positive, and calculation formulas are as follows $h=H+(h_1+h')$.

As a preferred solution, said keeping the laser receiver within a range of the laser scanning plane by an electric push rod specifically includes: if the laser receivers is out of the range of the laser scanning plane, and if last elevation data h' of the laser receiver are negative, pushing up the laser receiver by the electric push rod until the laser receiver outputs laser signal data, and feeding back displacement D via the electric push rod, where D is positive at this time; if last elevation data h' of the laser receiver are positive, pushing down the laser receiver through the electric push rod until the laser receiver outputs laser signal data, and feeding back displacement D via the electric push rod, where D is negative at this time; and changing the initial height of the laser receiver to $h_1+D$.

As a preferred solution, the method specifically includes conducting operation processing within a scope of use, establishing a three-dimensional coordinate system with the laser radar as the origin, when the mobile agricultural robot is within a working range of the laser radar, and if two rows of photosensitive films of the laser receiver are both sensitive to light, and an included angle between connection lines and longitudinal lines of sensing units of the two rows of photosensitive films is not a vertical angle, removing an error caused by the included angle from attitude; if there are only one row of photosensitive films sensitive to light in the two rows of photosensitive films, correcting, by point cloud computing, a positioning point at this moment according to two points nearby the positioning point, so as to obtain a more precise moving trajectory; if neither of the two rows of photosensitive films are sensitive to light, predicting a positioning point at this moment in combination with a prediction method in point cloud computing; and after obtaining predicted positioning data, integrating the positioning data into a set global coordinate system, determining to-be-removed outliers by matching with observations, and then fusing predicted three-dimensional coordinates of the central position of the laser receiver and observed three-dimensional coordinates of the central position of the laser receiver to obtain more precise position information.

As a preferred solution, a plurality of laser radars are arranged with one laser radar as a host, and the other laser radars as slaves, and through coordinate transformation, the slaves provide supplementary data for the host. The problem that an optical path between the laser and the positioned equipment in the complex environment is blocked is solved, and conflicts in the optical paths of multiple laser radars are also avoided.

The present disclosure is based on the following principle:

The hardware part is mainly composed of a laser receiver, a bus module and a laser radar, where the laser receiver is a marker fixed on a mobile agricultural robot, the bus module transcodes and transmits data of the laser receiver to the processor, and the laser radar is a fixed benchmark for constructing a positioning coordinate system. The method includes the following steps: obtaining laser signal data obtained by the laser receiver during driving of the mobile robot, where the laser receiver, after sensing the laser radar, emits a laser beam to generate laser signal data which specifically reflect the two states of receipt of a laser signal and non-receipt of the laser signal, and carry time labels; positioning the laser receiver, transcoding the laser signal data through the bus module, conducting scanning using the laser radar to obtain point cloud data of an obstacle, transmitting the laser signal data and the point cloud data to the processor, and conducting time-event matching on the point cloud data and the laser signal data on the processor, where time-event matching specifically includes realizing positioning of the mobile robot by representing a point in the point cloud data corresponding to a same time at which the laser signal is obtained and received by the laser receiver as a position of the laser receiver fixed on the mobile robot in the coordinate system with the laser radar as a coordinate origin.

The present disclosure has the following advantages:

1. It is not required to process all the point cloud data output by the laser radar, but only required to find out a midpoint of point cloud corresponding to the time of the laser signal data, which allows for lighter computation burden, less running time of algorithms, reliable calculation mode, higher positioning accuracy, stronger anti-interference ability and lower realization cost.

2. Through the installation of multiple laser radars, the problem that a laser optical path gets blocked is solved.

REFERENCE NUMERALS

Figure 1:
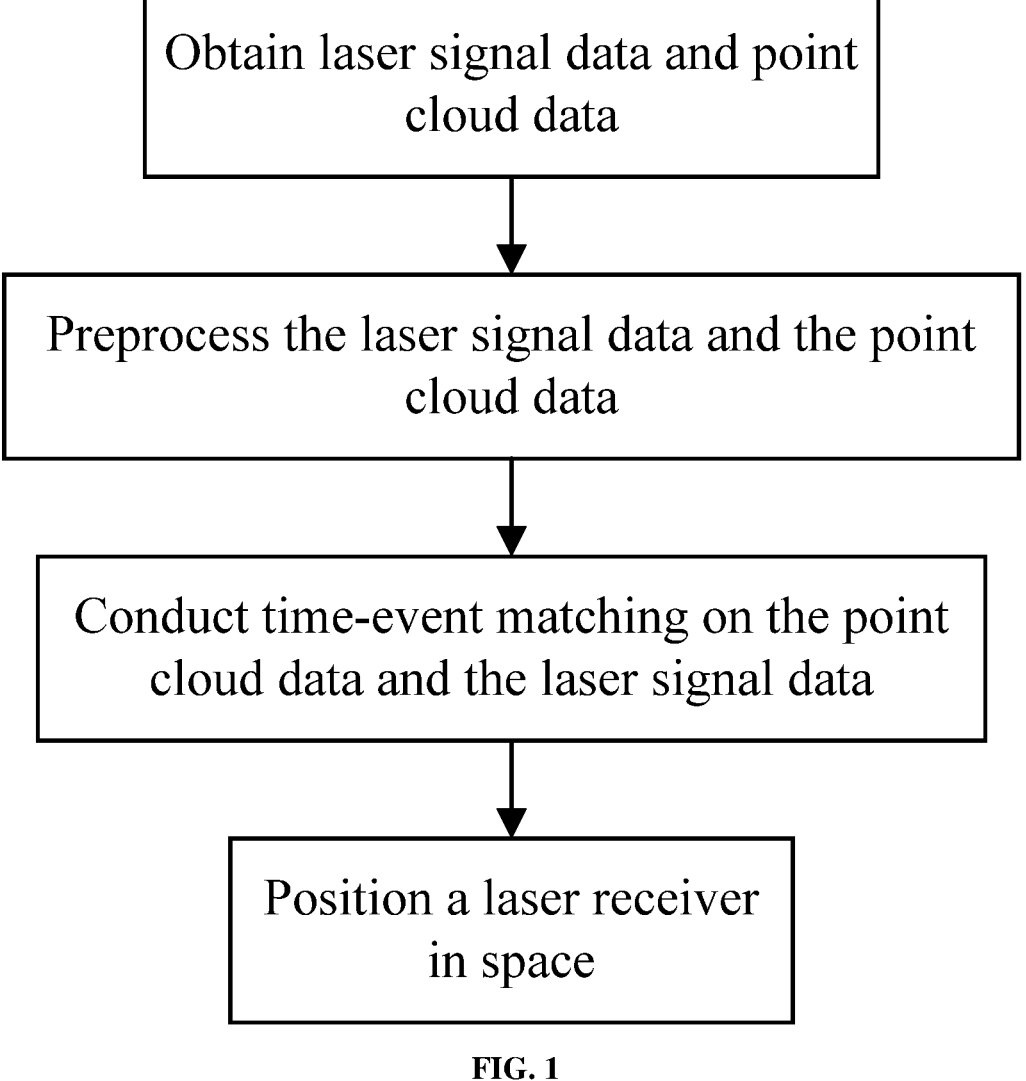
FIG. 1 is a flowchart for a method according to the present disclosure.
Figure 2:
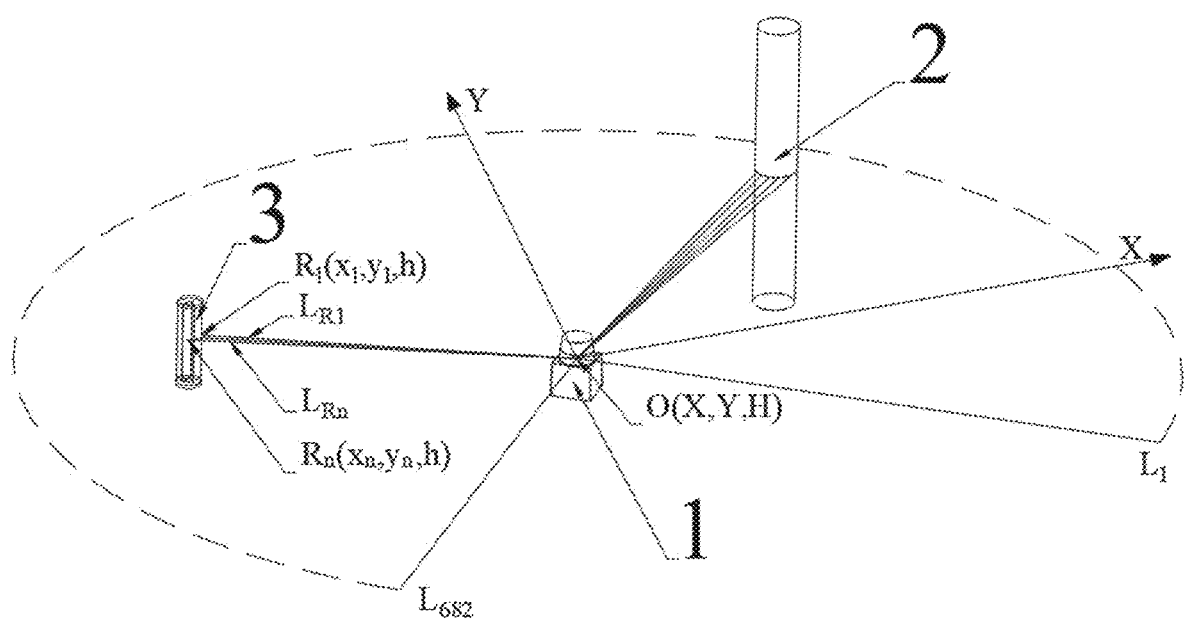
FIG. 2 is a schematic diagram of data obtained by the laser radar after scanning for one circle.
Figure 3:
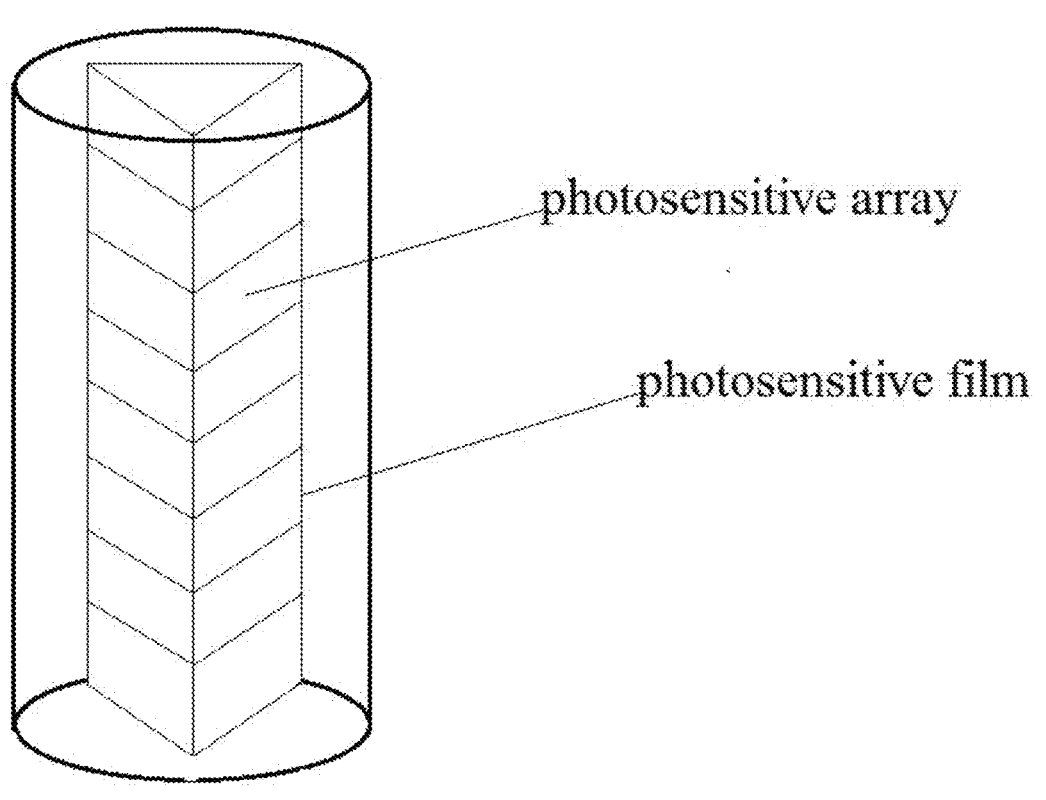
FIG. 3 is an enlarged view of a laser receiver illustrated in FIG. 2

1. laser radar, 2. obstacle, and 3. laser receiver.

$L_1$ denotes a first laser ray emitted by a laser radar.

$L_{682}$ denotes a last laser ray emitted by a laser radar.

$L_{R1}$ denotes a first ray emitted by a laser radar and irradiating a laser receiver.

$L_{Rn}$ denotes a last ray emitted by a laser radar and irradiating a laser receiver.

DETAILED DESCRIPTION

The following further describe the present disclosure in detail with reference to specific embodiments.

Embodiment I

This embodiment provides a laser sensing-based method for spatial positioning of an agricultural robot. The specific implementation object in this embodiment is a GNSS navigation-based unmanned agricultural robot. When an unmanned agricultural robot enters a hangar or is driven under a covering such as a bridge, GNSS navigation signal is weak or even interrupted. As a result, this positioning method is used to supplement positioning data. The laser radar is kept secured while fixing the laser receiver on the unmanned agricultural robot through an electric push rod.

A laser sensing-based method for spatial positioning of an agricultural robot, which achieves spatial positioning of the robot by the following steps:

(1) Construct a three-dimensional coordinate system, set a central position O(X, Y, H) of the laser radar as the origin of the three-dimensional coordinate system, set $L_1$ as a first laser ray emitted by the laser radar, set $L_n$ as a last laser ray emitted by the laser radar, set $L_{R1}$ as a first ray emitted by the laser radar and irradiating the laser receiver, set $L_{Rn}$ as a last ray emitted by the laser radar and irradiating the laser receiver, and denote points of intersection of the rays $L_{R1}$ and $L_{Rn}$ with the laser radar as $R_1(x_1, y_1, h)$ and $R_n(x_n, y_n, h)$, respectively; and solve three-dimensional point cloud coordinates from an included angle ρ between a corresponding laser ray and the first laser ray emitted by the laser radar, and a measured relative distance d by formulas $x=d\cdot\cos \rho$ and $y=d\cdot\sin \rho$.

When the laser radar conducts scanning for one circle, obtain coordinates of points $R_1(x_1, y_1, h)$, $R_n(x_n, y_n, h)$ by time-event matching between the time label of receipt of the laser signal in the laser signal data and the laser radar point cloud data, so as to obtain three-dimensional coordinates $$\left(\frac{x_1 + x_n}{2}, \frac{y_1 + y_n}{2}, h\right)$$

of the central position of the laser receiver within this scanning period.

(2) When the agricultural robot with the laser receiver enters a scanned area, stop and adjust the position of the laser light irradiated by the laser radar on the laser receiver through the electric push rod so that the laser light is irradiated in the middle of the laser receiver. At this time, the middle position of the laser receiver is as high as the scanning plane of the laser radar, so as to obtain the initial height $h_1$ of the laser receiver.

(3) Obtain the point cloud data scanned by the laser radar and the laser sensing data obtained by the laser receiver which both carry a time label, where each piece of point data of the point cloud data includes a distance from an obstacle to the laser radar, an angle with respect to an initial scanning line of the laser radar, and a time label.

The laser receiver includes a filter housing configured to eliminate ambient light and two photosensitive arrays configured to sense a laser signal, and output the laser signal as sensing laser status data after signal processing; the photosensitive arrays are divided into several segments in the vertical direction, different segments of the photosensitive arrays sense a laser signal and express the laser signal as elevation data h' of the laser receiver, each frame of laser signal data includes a piece of sensing laser status data and corresponding elevation data h' of the laser receiver, the laser receiver is kept within a range of the laser scanning plane by an electric push rod, the laser signal data and the point cloud data output by the laser radar both have a time label, and a set of point cloud data output by the laser radar and a set of laser signal data output by the laser receiver are obtained by conducting scanning using the laser radar for one circle.

Elevation data h are obtained specifically by comparing an initial height $h_1$ of the laser receiver corresponding to an initial height of the laser receiver with elevation data h' of the laser receiver obtained in a measurement process, where when the height of the laser receiver height is smaller than the initial height of the laser receiver, h' is negative, when the height of the laser receiver is greater than the initial height of the laser receiver, h' is positive, and calculation formulas are as follows $h=H+(h_1+h')$.

When the center height of the robot fluctuates with the ground, the laser radar scans different sensing segments of the laser receiver to obtain data about elevation change.

(4) If the laser receiver is out of the range of the laser scanning plane, and if last elevation data h' of the laser receiver are negative, push up the laser receiver by the electric push rod until the laser receiver outputs laser signal data, and feed back displacement D via the electric push rod, where D is positive at this time; if last elevation data h' of the laser receiver are positive, push down the laser receiver through the electric push rod until the laser receiver outputs laser signal data, and feed back displacement D via the electric push rod, where D is negative at this time; and change the initial height of the laser receiver to $h_1+D$.

(5) Transmit the point cloud data and laser sensing data to the processor, and by time-event matching, obtain coordinates of the laser receiver installed on the robot in the three-dimensional coordinate system established with the laser radar as the origin.

Time-event matching includes realizing positioning of the agricultural robot by representing a point in the point cloud data corresponding to a same time at which the laser signal is obtained and received by the laser receiver as a position of the laser receiver fixed on the mobile agricultural robot in the three-dimensional coordinate system with the laser radar as a coordinate origin.

(6) Obtain predicted location data to supplement missing positioning data and correct positioning data. The method specifically includes: conducting operation processing within a scope of use, establishing a three-dimensional coordinate system with the laser radar as the origin, when the mobile agricultural robot is within a working range of the laser radar, and if two rows of photosensitive films of the laser receiver are both sensitive to light, and an included angle between connection lines and longitudinal lines of sensing units of the two rows of photosensitive films is not a vertical angle, removing an error caused by the included angle from attitude; if there are only one row of photosensitive films sensitive to light in the two rows of photosensitive films, correcting, by point cloud computing, a positioning point at this moment according to two points nearby the positioning point, so as to obtain a more precise moving trajectory; if neither of the two rows of photosensitive films are sensitive to light, predicting a positioning point at this moment in combination with a prediction method in point cloud computing.

The prediction method specifically includes: when the agricultural robot with the laser receiver enters a scanned area, stop the robot, at this moment, the agricultural robot is started in a stationary state within the scanned area and begins to move, take the velocity and accelerated velocity of first measured coordinate point as zero, given that the spacing interval of frames is short, use points between two consecutive frames to represent linear motion of the mobile robot, therefore, the velocity and accelerated velocity of the second point can be calculated when the coordinates of the second point are obtained, and in this way, the next target point can be calculated as data for supplementing missing positioning data and correcting positioning data.

After obtaining predicted positioning data, integrate the positioning data into a set global coordinate system, determining to-be-removed outliers by matching with observations, and then fuse predicted three-dimensional coordinates of the central position of the laser receiver and observed three-dimensional coordinates of the central position of the laser receiver to obtain more precise position information.

(7) By installing the laser receiver at the position of the agricultural robot, calculate positioning coordinates for the center of gravity of the agricultural robot.

Embodiment II

This embodiment provides a laser sensing-based method for spatial positioning of an agricultural robot, which makes it possible to build an auxiliary experimental platform for indoor GNSS positioning research. The laser radar is kept secured while fixing the laser receiver on the mobile trolley through an electric push rod. Through precise positioning, the indoor GNSS positioning system is adjusted.

Contents not mentioned in this embodiment may refer to those in Embodiment I.

The foregoing embodiments are preferred implementations of the present disclosure. However, the implementations of the present disclosure are not limited by the above embodiments. Any change, modification, substitution, combination, and simplification made without departing from the spirit and principle of the present disclosure should be an equivalent replacement manner, and all fall within the protection scope of the present disclosure.

What is claimed is:

1. A laser sensing-based method for spatial positioning of an agricultural robot, comprising:

Step 1: erecting a laser radar with a ranging function in a positioning space, setting a three-dimensional coordinate system, and conducting scanning using the laser radar to obtain point cloud data of an object in the positioning space, wherein the point cloud data comprise an azimuth and a distance with respect to the laser radar;

Step 2: installing a laser receiver on the agricultural robot, receiving a laser radar signal using the laser receiver during movement, and when a laser beam emitted by the laser radar irradiates the laser receiver, outputting laser signal data and elevation data h from the laser receiver;

wherein the laser receiver comprises a filter housing configured to eliminate ambient light and two photosensitive arrays configured to sense a laser signal, and output the laser signal as sensing laser status data after signal processing; the photosensitive arrays are divided into several segments in a vertical direction, different segments of the photosensitive arrays sense the laser signal and express the laser signal as an elevation data h' of the laser receiver, each frame of the laser signal data comprises a piece of the sensing laser status data and the elevation data h' of the laser receiver, the laser receiver is kept within a range of a laser scanning plane by an electric push rod, the laser signal data and the point cloud data output by the laser radar both have a time label, and a set of the point cloud data output by the laser radar and a set of the laser signal data output by the laser receiver are obtained by conducting scanning using the laser radar for one circle; and Step 3: conducting time-event matching on the laser signal data obtained by the laser receiver and the point cloud data scanned by the laser radar within each scanning period of the laser radar to obtain three-dimensional coordinates of a central position of the laser receiver.

2. The laser sensing-based method for spatial positioning of an agricultural robot according to claim 1, wherein in Step 1, each piece of point data of the point cloud data comprises a distance from an obstacle to the laser radar, an angle with respect to an initial scanning line of the laser radar, and a time label.

3. The laser sensing-based method for spatial positioning of an agricultural robot according to claim 1, wherein in Step 1, the laser radar is erected to ensure that the laser scanning plane is horizontal, an installation height is known, and the laser receiver is installed within the range of a received laser scanning plane, and an initial height $h_1$ of the laser receiver is obtained according to the elevation data h fed back by the laser receiver after laser light irradiates the laser receiver.

4. The laser sensing-based method for spatial positioning of an agricultural robot according to claim 1, wherein said conducting time-event matching in Step 3 specifically comprises realizing positioning of the agricultural robot by representing a point in the point cloud data corresponding to a same time at which the laser radar signal is obtained and received by the laser receiver as a position of the laser receiver fixed on the agricultural robot in the three-dimensional coordinate system with the laser radar as a coordinate origin.

5. The laser sensing-based method for spatial positioning of an agricultural robot according to claim 1, wherein in Step 1, the three-dimensional coordinate system is constructed as follows:

setting a central position O(X, Y, H) of the laser radar as an origin of the three-dimensional coordinate system, setting $L_1$ as a first laser ray emitted by the laser radar, setting $L_n$ as a last laser ray emitted by the laser radar, setting $L_{R1}$ as a first ray emitted by the laser radar and irradiating the laser receiver, setting $L_{Rn}$ as a last ray emitted by the laser radar and irradiating the laser receiver, and denoting points of intersection of the rays $L_{R1}$ and $L_{Rn}$ with the laser radar as $R_1(x_1, y_1, h)$ and $R_n(x_n, y_n, h)$, respectively;

solving three-dimensional point cloud coordinates from an included angle $\rho$ between a corresponding laser ray and the first laser ray emitted by the laser radar, and a measured relative distance d by formulas $x = d \cdot \cos \rho$ and $y = d \cdot \sin \rho$; and when the laser radar conducts scanning for one circle, obtaining coordinates of points $R_1(x_1, y_1, h)$, $R_n(x_n, y_n, h)$ by time-event matching between the time label of receipt of the laser radar signal in the laser signal data and the point cloud data, so as to obtain three-dimensional coordinates $$\left( \frac{x_1 + x_n}{2}, \frac{y_1 + y_n}{2}, h \right)$$

of the central position of the laser receiver within this scanning period.

6. The laser sensing-based method for spatial positioning of an agricultural robot according to claim 5, wherein the elevation data h are obtained specifically by comparing an initial height $h_1$ of the laser receiver with the elevation data h' of the laser receiver obtained in a measurement process, wherein when a height of the laser receiver is smaller than the initial height $h_1$ of the laser receiver, h' is negative, when the height of the laser receiver is greater than the initial height $h_1$ of the laser receiver, h' is positive, and calculation formulas are as follows $h = H + (h_1 + h')$.

7. The laser sensing-based method for spatial positioning of an agricultural robot according to claim 1, wherein said keeping the laser receiver within a range of the laser scanning plane by an electric push rod specifically comprises: if the laser receiver is out of the range of the laser scanning plane, and if the last elevation data h' of the laser receiver are negative, pushing up the laser receiver by the electric push rod until the laser receiver outputs the laser signal data, and feeding back displacement D via the electric push rod, wherein D is positive at this time; if the last elevation data h' of the laser receiver are positive, pushing down the laser receiver through the electric push rod until the laser receiver outputs the laser signal data, and feeding back displacement D via the electric push rod, wherein D is negative at this time; and changing an initial height $h_1$ of the laser receiver to $h_1 + D$.

8. The laser sensing-based method for spatial positioning of an agricultural robot according to claim 1, wherein the method specifically comprises conducting operation processing within a scope of use, establishing the three-dimensional coordinate system with the laser radar as an origin, when the mobile agricultural robot is within a working range of the laser radar, and if two rows of photosensitive films of the laser receiver are both sensitive to light, and an included angle between connection lines and longitudinal lines of sensing units of the two rows of photosensitive films is not a vertical angle, removing an error caused by the included angle from attitude; if there is only one row of photosensitive films sensitive to light in the two rows of photosensitive films, correcting, by point cloud computing, a positioning point at this moment according to two points nearby the positioning point, so as to obtain a more precise moving trajectory; if neither of the two rows of photosensitive films are sensitive to light, predicting a positioning point at this moment in combination with a prediction method in point cloud computing to obtain predicted positioning data; and after obtaining the predicted positioning data, integrating the predicted positioning data into a set global coordinate system, determining to-be-removed outliers by matching with observations, and then fusing predicted three-dimensional coordinates of the central position of the laser receiver and observed three-dimensional coordinates of the central position of the laser receiver to obtain more precise position information.

* * * * *